(12) United States Patent
Shcherbina et al.

(10) Patent No.: US 12,524,065 B2
(45) Date of Patent: Jan. 13, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Artem Shcherbina, Kyiv (UA); Ivan Bondarets, Kyiv (UA); Oleksandr Trunov, Kyiv (UA); Viacheslav Olshevskyi, Kyiv (UA); Volodymyr Savin, Kyiv (UA)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 563 days.

(21) Appl. No.: 17/940,761

(22) Filed: Sep. 8, 2022

(65) Prior Publication Data
US 2023/0004214 A1    Jan. 5, 2023

Related U.S. Application Data

(63) Continuation of application No. PCT/KR2021/020135, filed on Dec. 29, 2021.

(30) Foreign Application Priority Data

Dec. 30, 2020    (KR) .......................... 10-2020-0188276

(51) Int. Cl.
*G06K 9/36*    (2006.01)
*G06F 3/01*    (2006.01)
(Continued)

(52) U.S. Cl.
CPC .............. *G06F 3/011* (2013.01); *G06F 3/017* (2013.01); *G06T 7/50* (2017.01); *G06T 19/006* (2013.01)

(58) Field of Classification Search
CPC ........ G06F 3/011; G06F 3/017; G06F 3/0304; G06F 3/005; G06T 7/50; G06T 19/006;
(Continued)

(56) References Cited

U.S. PATENT DOCUMENTS 10,043,084 B2    8/2018    Zhou et al.
10,657,367 B2    5/2020    Fei et al.
(Continued)

FOREIGN PATENT DOCUMENTS

CN    106933350 A    7/2017
CN    108230328 B    10/2021
(Continued)

OTHER PUBLICATIONS

English translated of KR20110104686A (Year: 2011).*
Iqbal et al., "Hand Pose Estimation via Latent 2.5D Heatmap Regression", arXiv:1804.09534v1 [cs.CV] Apr. 25, 2018, https://arxiv.org/abs/1804.09534, (20 pages total).
(Continued)

*Primary Examiner* — Duy M Dang
(74) *Attorney, Agent, or Firm* — Sughrue Mion, PLLC

(57) ABSTRACT

An electronic apparatus and a controlling method thereof are provided. The electronic apparatus providing augmented reality (AR) content includes a display, a camera and a processor configured to display augmented reality (AR) content through the display, detect a hand of a user from image obtained through the camera, and identify a first interaction of the hand with the AR content based on a size of the hand, wherein the size of the hand is obtained based on the information about an object provided through the display.

12 Claims, 22 Drawing Sheets

(51) Int. Cl.
*G06T 7/50* (2017.01)
*G06T 19/00* (2011.01)

(58) Field of Classification Search
CPC ............ G06T 2207/10024; G06T 7/70; G06V 40/20; G06V 40/28
See application file for complete search history.

(56) References Cited

U.S. PATENT DOCUMENTS

| | | |
|---|---|---|
| 10,747,371 B1 | 8/2020 | Kulbida |
| 11,127,151 B2 | 9/2021 | Liu et al. |
| 2012/0113223 A1 | 5/2012 | Hilliges et al. |
| 2014/0300722 A1 | 10/2014 | Garcia |
| 2017/0140552 A1 | 5/2017 | Woo et al. |
| 2018/0024641 A1 | 1/2018 | Mao et al. |
| 2019/0138107 A1* | 5/2019 | Nietfeld ................ G06T 19/006 |
| 2019/0311491 A1 | 10/2019 | Liu et al. |
| 2020/0402321 A1* | 12/2020 | Wu ........................... G06T 7/70 |
| 2021/0093050 A1 | 4/2021 | Lee et al. |

FOREIGN PATENT DOCUMENTS

| | | |
|---|---|---|
| JP | 6394735 A | 9/2018 |
| JP | 6717393 B2 | 7/2020 |
| KR | 10-2011-0104686 A | 9/2011 |
| KR | 10-2016-0000873 A | 1/2016 |
| KR | 10-1603890 B1 | 3/2016 |
| KR | 10-2019-0106601 A | 9/2019 |
| WO | 2013/059599 A1 | 4/2013 |

OTHER PUBLICATIONS

Written Opinion (PCT/ISA/237) issued by the International Searching Authority dated Apr. 5, 2022 in International Application No. PCT/KR2021/020135.

International Search Report (PCT/ISA/210) issued by the International Searching Authority dated Apr. 5, 2022 in International Application No. PCT/KR2021/020135.

Communication issued Aug. 12, 2025 by the Korean Intellectual Property Office in Korean Patent Application No. 10-2020-0188276.

* cited by examiner (1) $a = f \times (1 + \frac{L_1}{L_2})$ (2) $a = f \times (\frac{L_1}{L_2})$

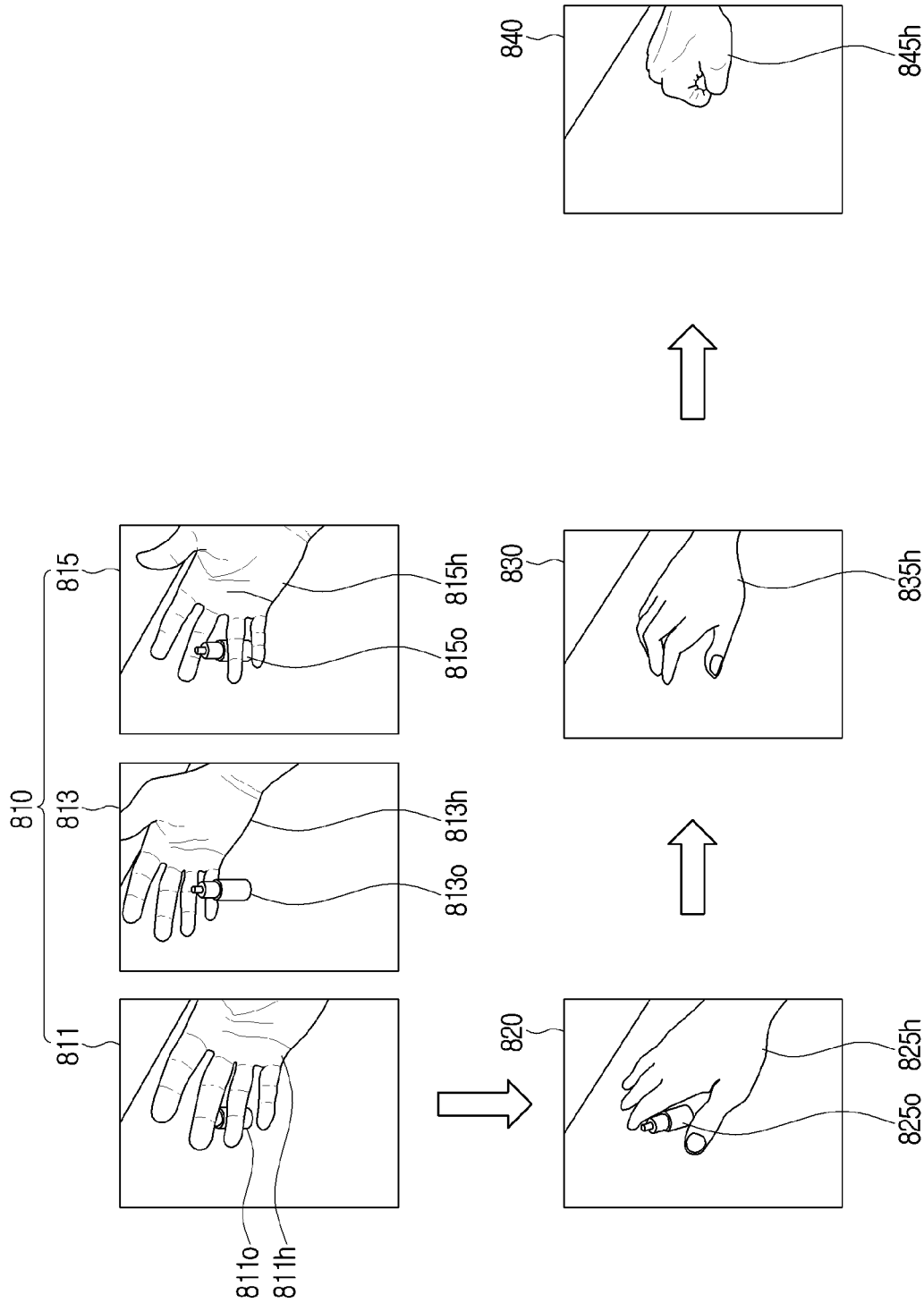

(2)

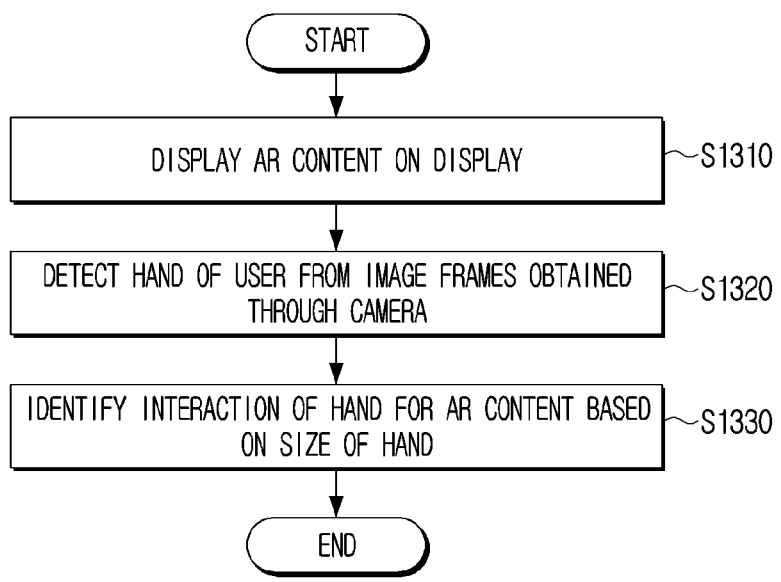

ELECTRONIC APPARATUS AND CONTROLLING METHOD THEREOF

CROSS-REFERENCE TO RELATED APPLICATION(S)

This application is a bypass continuation of International Application No. PCT/KR2021/020135, filed on Dec. 29, 2021, which is based on and claims priority to Korean Patent Application No. 10-2020-0188276, filed on Dec. 30, 2020, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus for estimating a distance of an object using a camera and a controlling method thereof.

2. Description of the Related Art

With the development of electronic technology, augmented reality (AR) market is rapidly growing. The AR market is focusing on two sub-trends such as software (SW) and AR application (apps) development including mobile AR, AR for shopping, AR for navigation, AR for enterprise, etc., and hardware (HW) development in which the AR domain is largely expanded thanks to the emergence of a neural network processing unit (NPU), digital signal processing (DSP), and artificial intelligence (AI) technology.

Recently, the size of a wearable AR device (e.g., AR glasses, etc.) is continuously becoming smaller and lightweight, and as a result of such miniaturization, there is less space for sensors and battery in an electronic apparatus. The size of electronic device and backup power decrease leads to switching from depth sensors (e.g., structured light, time of flight (ToF), etc.) to related art cameras (e.g., red, green, blue (RGB) camera), switching from stereo vision to monocular vision, and switching from global shutter to rolling shutter cameras for miniaturization and cost saving. As such, monocular cameras are getting important.

When an electronic apparatus displays a virtual object such as content rendered in a three-dimensional (3D) space and a user interface (UI) element in AR environment, a user may perform interaction with the virtual object. A natural way of interaction with such objects is using gestures of moving hands of a user.

However, it is difficult to accurately estimate the distance (or position of the hand) between the electronic apparatus and the hand (in particular, the moving hand) using only the two-dimensional image obtained through the monocular camera. This may lead to interaction with a different virtual object (i.e., imprecise interaction) other than an intended virtual object, or interaction failure.

SUMMARY

Provided are an electronic apparatus for estimating a distance to an object more accurately by using a camera and a controlling method thereof.

According to an aspect of the disclosure, an electronic apparatus may include a display, a camera and a processor configured to display augmented reality (AR) content thorough the display, detect a hand of a user based on image obtained through the camera, and identify a first interaction of the hand with the AR content based on a size of the hand, wherein the size of the hand is obtained based on the information about an object provided through the display.

The processor may be further configured to set the size of the detected hand to a preset value, identify whether the second interaction of the hand occurs for the object provided through the display based on the set size, based on identifying that the second interaction occurs, identify the size of the hand based on the information on the object, and identify the first interaction of the hand for the AR content based on the identified size of the hand.

The object may comprise at least one of a first type object included in the image obtained through the camera and a second type object included in the AR content displayed on the display.

The electronic apparatus may include a memory storing feature information and size information of a reference object, wherein the processor is further configured to, based on the first type object and the hand of the user being detected from image obtained through the camera, identify whether the first type object is the reference object based on the feature information stored in the memory and feature information of the detected first type object, and based on identifying that the first type object is the reference object, identify the size of the hand based on a size of the reference object.

The processor may be further configured to, based on identifying that the first type object is not the reference object based on the feature information stored in the memory and the feature information of the detected first type object, identify the size of the first type object included in consecutive image frames by using the consecutive image frames obtained through the camera, and identify the size of the hand based on the size of the first type object.

The processor may be further configured to set the size of the hand to a preset value, identify whether the second interaction of the hand occurs with the second type object through the display based on the set size, and identify the size of the hand based on a depth of the second type object in which interaction of the hand is identified.

In accordance with an aspect of the disclosure, a method of controlling an electronic apparatus may include displaying augmented reality (AR) content on the display, detecting a hand of a user based on image obtained through the camera and identifying a first interaction of the hand with the AR content based on a size of the hand, wherein the size of the hand is obtained based on the information about an object provided through the display.

The method may further include setting the size of the detected hand to a preset value, identifying whether the second interaction of the hand occurs for the object provided through the display based on the set size and based on identifying that the second interaction occurs, identifying the size of the hand based on the information on the object.

The object comprises at least one of a first type object included in the image obtained through the camera and a second type object included in the AR content displayed on the display.

The method may further include based on the first type object and the hand of the user being detected from image obtained through the camera, identifying whether the first type object is a reference object based on the feature information stored in the electronic apparatus and feature information of the detected first type object and based on identifying that the first type object is the reference object, identifying the size of the hand based on a size of the reference object.

The method may further include based on identifying that the first type object is not the reference object based on the feature information stored in the electronic apparatus and the feature information of the detected first type object, identifying the size of the first type object included in consecutive image frames by using the consecutive image frames obtained through the camera, and identifying the size of the hand based on the size of the first type object.

The method may further include setting the size of the hand to a preset value, identifying whether the second interaction of the hand occurs with the second type object through the display based on the set size and identifying the size of the hand based on a depth of the second type object in which interaction of the hand is identified.

According to various embodiments of the disclosure, an electronic apparatus for estimating a distance to an object more accurately by using a camera and a controlling method thereof are provided.

According to an embodiment of the disclosure, the size of a user's hand may be accurately estimated, and a parameter for a user's hand may be accurately estimated.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8A is a diagram illustrating a method of detecting an object interacting with a hand according to an embodiment of the disclosure;

FIG. 13 is a diagram illustrating a flowchart according to an embodiment of the disclosure.

DETAILED DESCRIPTION

Figure 1A:
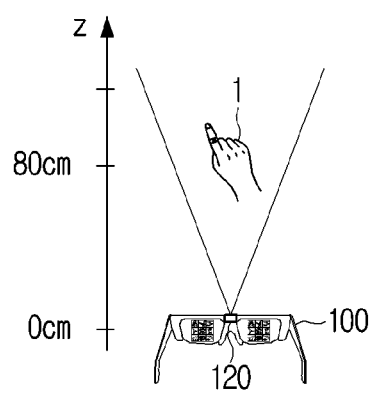
FIGS. 1A and 1B are diagrams illustrating an electronic apparatus according to an embodiment of the disclosure.

In the following description, a detailed description of known functions and configurations may be omitted when it may obscure the subject matter of the disclosure. In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements throughout.

The terms "first," "second," as used in the disclosure, may be modified regardless of the order and/or importance, and the components may not be used to distinguish one element from other components but are not limited thereto.

In the description, expressions such as "A or B," "at least one of A or/and B," or "one or more of A or/and B" may include all possible combinations of the items that are enumerated together. For example, the term "at least one of A [or/and] B" means (1) including at least one A, (2) including at least one B, or (3) including both at least one A and at least one B.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the other element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Figure 1B:
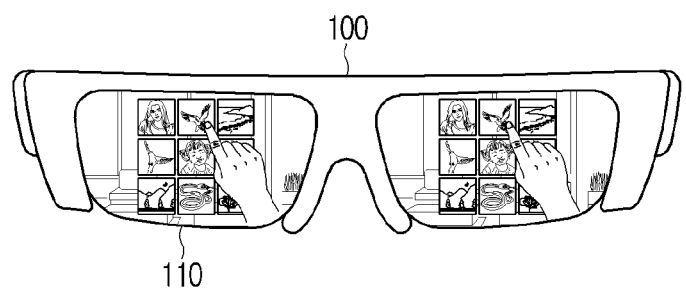

FIGS. 1A and 1B are diagram illustrating an electronic apparatus according to an embodiment.

Referring to FIGS. 1A and 1B, an electronic apparatus 100 may provide content of augmented reality (AR).

The electronic apparatus 100 may be implemented as a wearable device which a user may wear. A wearable device may be embodied as various types of devices such as an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); a bio-implantable circuit, or the like. The electronic apparatus 100 may be implemented as a smartphone, a tablet personal computer (PC), an e-book reader, a laptop PC, a navigator, a vehicle, or the like. The electronic apparatus 100 may be implemented as a bendable flexible device.

An AR content may represent content provided in an AR environment. The AR environment may allow a virtual object to appear as if the virtual object is actually present in the surrounding environment by providing AR content, which represents a virtual object that does not actually exist in the surrounding environment of the user, along with the surrounding environment through the display. Furthermore, the AR content may be content for providing additional information (e.g., additional information for an object present in an actually existing environment, weather information, etc.).

Referring to FIG. 1A, the electronic apparatus 100 may obtain an image frame through the camera 120.

The camera 120 may be a general camera, unlike the stereo camera and the depth camera. The camera 120 may include a monocular camera. The monocular camera may include a camera capable of obtaining an image frame that includes two-dimensional position information (e.g., position information on the x-axis representing the horizontal direction and on the y-axis representing the vertical direction). The monocular camera may be lightweight, may be miniaturized, and reduce costs compared to a stereo camera including two monocular cameras, or a depth camera capable of obtaining depth information.

The image frame may include a hand 1 of a user. Specifically, the camera 120 may obtain an image frame including the hand 1 of the user by capturing the hand 1 of the user.

For example, referring to FIG. 1B, the electronic apparatus 100 may display the AR content to the display 110. The electronic apparatus 100 may match a region (or pixel) of the display 110 to a region (or position) on a virtual three-dimensional space, and may display the AR content on a region of the display 110 corresponding to a 3D region. The AR content displayed on the display 110 may include three-dimensional position information.

In this example, the electronic apparatus 100 may identify an interaction with the AR object displayed on the display 110 based on the hand 1 of the user (or pose of the hand 1) included in the image frame obtained through the camera 120.

For example, the electronic apparatus 100 may detect the hand 1 of the user included in the image frame obtained through the camera 120, compare the position information of the hand 1 (or position information of the hand 1 defined according to the pose of the hand 1) and the position information of the AR object, and identify whether an interaction with respect to the AR object is generated. However, this is merely an example, and the electronic apparatus 100 may identify an interaction between the hand 1 and the AR object using various related art methods.

The interaction may indicate at least one of an operation in which the hand of a user contacts the AR object, an operation that the hand of the user points to the AR object, and an operation in which the hand of the user approaches the AR object. For example, the electronic apparatus 100 may determine that an interaction with the AR object displayed on the display 110 is generated when the hand 1 of the user is located at a position (e.g., xyz coordinate) on which the AR object is displayed, or the distance between the hand 1 of the user and the position (e.g., xyz coordinate) where the AR object is displayed is less than a predetermined distance.

The hand 1 of the user (or pose of the hand 1) may be defined based on the parameter of the hand 1.

Figure 1C:
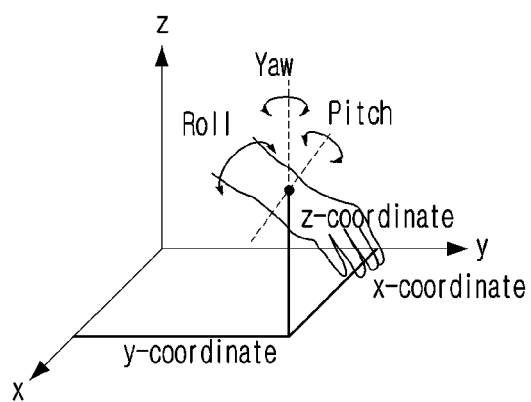
FIG. 1C is a diagram illustrating a parameter of a user's hand according to an embodiment of the disclosure.

FIG. 1C is a diagram illustrating a parameter of a user's hand according to an embodiment.

Referring to FIG. 1C, a parameter for the hand 1 may include position information (i.e., a position on the x-axis, the y-axis, and the z-axis) indicating a position of the hand 1 (or wrist, finger, etc.) on the three-dimensional space. The parameters for the hand 1 may also include rotation information (i.e., rotation for pitch, yaw, and roll) indicating the direction and the degree of rotation of the hand 1 around the central axis of the wrist of the user.

As such, the parameters for the hand 1 may include three degrees of freedom (3DOF) representing three motion directions, such as position information on the x-axis, y-axis, and z-axis or rotation information of pitch, yaw, and roll. Alternatively, six degrees of freedom (6DOF) indicating six motion directions such as position information on the x-axis, y-axis, and z-axis relative to hand 1, and rotation information of pitch, yaw, and roll may be included. However, this is merely exemplary and the parameters for the hand 1 may mean various parameters such as a finger length, a finger bending angle, and the like.

The parameters for the hand 1 (i.e., 3DOF or 6DOF), may typically be calculated based on the size of the hand.

According to an embodiment, the electronic apparatus 100 may identify the size of the hand 1 using the image frame obtained through the camera 120 to determine parameters for the hand 1. The electronic apparatus 100 may identify the interaction of the hand 1 and the AR object displayed on the display 110 using parameters for the hand 1.

Figure 1D:
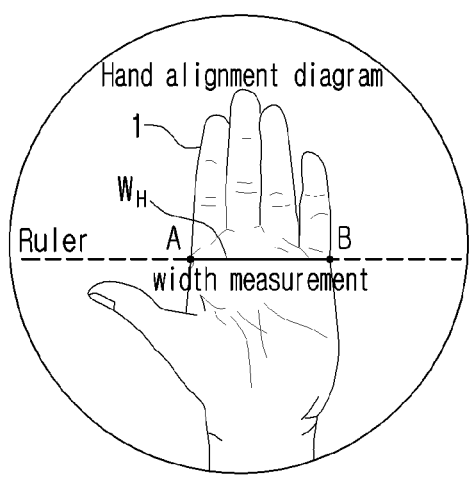
FIG. 1D is a diagram illustrating a user's hand size according to an embodiment of the disclosure.

FIG. 1D is a diagram illustrating a user's hand size according to an embodiment.

Referring to FIG. 1D, the size of the hand 1 may include at least one of a width $W_H$ (or breadth) of the hand 1, an area (or volume) of the hand 1, a length of a finger constituting the hand 1, and the like. The electronic apparatus 100 may estimate the size of the hand 1 in unit of millimeter.

According to an embodiment, even if the camera 120 is used, the hand 1 and the AR object displayed on the display 110 may be accurately identified based on the size of the hand 1.

Hereinafter, a method for determining the size of a hand according to various embodiments will be described in detail with reference to the accompanying drawings.

Figure 2:
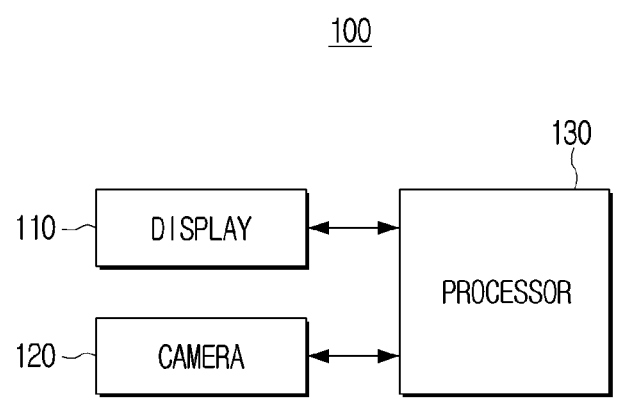
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, the electronic apparatus 100 may include a display 110, a camera 120, and a processor 130.

The display 110 is a device that provides visual information. For example, the display 110 may display the image frame in the entire or partial area of the display area. The display area of the display 110 may include a plurality of pixels divided by different positions. The display 110 may display an image frame by emitting light having a color and a brightness value included in each pixel of the image frame for each pixel of the display 110.

According to an embodiment, the display 110 may be implemented as a liquid crystal display (LCD) that uses a separate backlight unit (e.g., a light emitting diode (LED)) as a light source and controls the molecular arrangement of a liquid crystal, thereby controlling the degree of light emitting from the backlight unit to be transmitted through the liquid crystal (brightness of light or intensity of light). According to another embodiment, the display 110 may be implemented as a display using a self-light-emitting device (e.g., a mini LED having a size of 100-200 um, a micro LED light having a size of 100 um or less, an organic LED (OLED), a quantum dot LED (QLED), etc.) as a light source without a separate backlight unit or a liquid crystal.

The display 110 may be implemented in the form of a touch screen capable of sensing a touch operation of a user. As another example, the display 110 may be implemented in the form of a flexible display having a characteristic that a portion of the display 110 may be bent or folded or unfolded again, or the display 110 may be implemented as a transparent display having a characteristic that allows the display 110 to show an object located behind the display 110 to be transparently seen.

The camera 120 may obtain an image frame. The camera 120 may obtain an image frame including an object by capturing an object (i.e., a subject) existing in a field of view (FoV) in a specific point of view (PoV). For example, an object included in an image frame may include an object or a user's hand, in a surrounding environment.

The camera 120 may include at least one lens 121 (FIG. 5), an image sensor 123 (FIG. 5), and an image processor. The lens 121 may condense or split the light reflected from the subject to the image sensor 123. The image sensor 123 may include a plurality of pixels arranged to be divided into different positions on a two-dimensional plane. The image sensor 123 may divide the light transmitted from the lens 121 into pixel units to detect red, green, and blue colors for each pixel to generate an electrical signal. The image processor may obtain an image frame representing the color and brightness of the subject according to the electrical signal sensed by the image sensor 123. Here, in the image frame, a real 3D space is projected in a virtual 2D plane, i.e., the image frame may include a plurality of pixels having different 2D position information (e.g., an x-axis position, a y-axis position). Each pixel of the image frame may include a particular color and brightness value.

The camera 120 may perform continuous capturing with respect to time with a frame rate indicating a capturing speed (or a capturing cycle) to sequentially (or periodically) obtain a plurality of image frames. For example, when the camera 120 captures a surrounding environment with a frame rate of 30 frame per second (fps), 30 image frames per second may be sequentially obtained.

The image frame obtained through the camera 120 may include information on at least one of a frame rate, a capturing time, and a view angle captured by the camera 120. The field of view may be determined according to the focal length of the lens 121 of the camera 120 and the size (e.g., diagonal length) of the image sensor 123 of the camera 120, or the like. The information on at least one of the above-described frame rate, time, and field of view may be included in the image frame itself or included in metadata corresponding to the image frame.

The processor 130 may control the electronic apparatus 100 or overall configuration of the electronic apparatus 100. The processor 130 may control the electronic apparatus 100 by executing at least one instruction stored in a memory provided in the processor 130 or a memory 160 (see FIG. 13) existing outside the processor 130. The memory included in the processor 130 may include a read-only memory (ROM) (e.g., NOR NAND or NAND type flash memory), a random access memory (RAM) (e.g., dynamic RAM (DRAM), a synchronous DRAM (SDRAM), a double data rate SDRAM (DDR SDRAM), a volatile memory, and the like.

The processor 130 may be configured as one or a plurality of processors, and each processor may be implemented as a general-use processor such as a central processing unit (CPU), an application processor (AP), a graphics-only processor such as a graphic processing unit (GPU), a vision processing unit (VPU), or the like, or an artificial intelligence (AI)-only processor such as a neural processing unit (NPU). The plurality of processors may be implemented in the form of an integrated chipset or may be implemented in the form of a separate chipset.

The GPU and CPU may perform the operation of the disclosure in association with each other. For example, the GPU may process image frames or the like in data, and the CPU may process the remaining data (e.g., instructions, code, etc.). In this example, the GPU is implemented with a structure having hundreds or thousands of cores specialized in a parallel processing method for processing various instructions or data at the same time, and the CPU may be implemented with a structure having several cores specialized in a serial processing method in which instructions or data are processed in an input order. For example, the GPU may process the image frame of the disclosure to obtain information, and the CPU may process or operate information obtained through the image frame.

Figure 3:
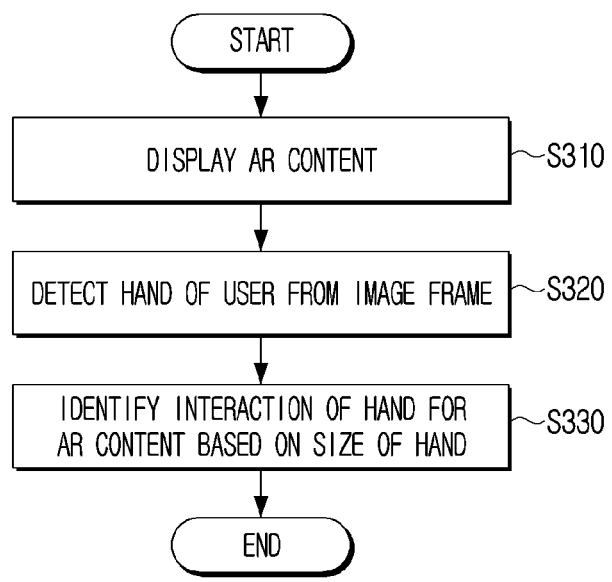
FIG. 3 is a diagram illustrating an operation of a processor according to an embodiment of the disclosure.

FIG. 3 is a diagram illustrating an operation of a processor according to an embodiment of the disclosure.

Referring to FIG. 3, in operation S310, the processor 130 may display AR content on the display 110. The processor 130 may control the display 110 to display AR content.

The AR content may be implemented in various types such as an image, a moving image, an animation effect, etc. For example, AR content may be a real object (e.g., a TV, a digital picture, a sound bar, a refrigerator, a washing machine, furniture, a vehicle, a building, a tree, etc.) in a two-dimensional or three-dimensional rendered image. For example, the AR content may be one of a variety of types, such as text, character, images, pictures, videos, documents, dashboard, and the like. The processor 130 may control the display 110 to display AR content by adjusting the transparency of the AR content. The AR content may be displayed on the display 110 in an opaque or translucent state.

The AR content may be displayed in a location on the virtual three-dimensional space (e.g., xyz coordinates) through the display 110. Here, the location on the virtual three-dimensional space may be mapped to a two-dimensional plane of the display 110 (e.g., flat or curved plane).

For example, the processor 130 may display the AR content such that the center of the AR content is located in a pixel located at the coordinate (90, 180) of the display 110 corresponding to the coordinate (100, 200, 50) on the virtual three-dimensional space.

In operation S320, the processor 130 may detect the user's hand from the image frames obtained through the camera 120.

In this example, programming libraries for analyzing real-time computer vision (e.g., OpenCV, Python, etc.), various color filters such as Sobel filter or Fuzzy filter, and various algorithms such as canny edge detection, color-based, template-based, and background differentiation methods may be used.

For example, the processor 130 may perform a preprocessing to binarize the color of a plurality of pixels included in the image frame. The processor 130 may detect bundle (or group) of adjacent pixels having similar colors based on the binarized color (or contrast) of each pixel as one objects, and the processor 130 may detect (identify) an object having a shape, a rate and a curvature similar to the hand (or finger) of the identified object as the user's hand 1.

In operation S330, the processor 130 may identify the interaction of the hand 1 for the AR content based on the size of the hand 1.

Specifically, the size of the hand 1 may be set to a predetermined value. Alternatively, the size of the hand 1 may be a value obtained based on the information on the object when the interaction of the hand with respect to the object provided through the display 110 is generated. The interaction of the hand with respect to the object provided through the display 110 may be an operation that occurs before the interaction of the hand 1 with respect to the AR content described above.

The processor 130 may identify the pixel size of hand 1 detected on the image frame. The pixel size may mean the number of pixels included in the area representing at least one of the width (or breadth) of the hand 1 detected in the image frame, the length of the finger constituting the hand 1, and the area (or volume) of the hand 1.

The processor 130 may calculate the distance between the electronic apparatus 100 and the hand 1 using the size of the hand 1 and the pixel size of the hand. Here, the distance may mean a value (or depth) on the z-axis.

For example, the processor 130 may calculate the distance of the hand 1 corresponding to the size of the hand 1 and the pixel size of the hand 1 according to Table 1 in which the corresponding relationship among the size of the hand 1, distance of the hand 1, and the pixel size of the hand 1 detected from the image frame are calculated.

TABLE 1

| Size | Distance | Pixel size |
| --- | --- | --- |
| 0.2 meters | 0.5 meters | 200 |
| 0.2 meters | 1 meter | 100 |
| 0.2 meters | 2 meters | 50 |
| 0.3 meters | 0.5 meters | 300 |
| 0.3 meters | 1 meter | 150 |
| 0.3 meters | 2 meters | 75 |
| . . . | . . . | . . . |

The size may represent at least one of a length and an area that is obtained by physically measuring an object (i.e., an object present in a real space and may include an object such as the hand 1, smartphone, or the like) that is a target of capturing of the camera 120. The distance may represent a length between the electronic apparatus 100 (or the camera 120) and an object (e.g., an object such as the hand 1, a smartphone, etc.). The distance may be expressed as a value on the z-axis. The pixel size may represent the number of pixels included in an area representing at least one of a length and an area of an object (e.g., the hand 1, a smartphone, etc.) present in a virtual space (e.g., an image frame).

The processor 130 may identify the position of the hand 1 through the position information of the pixel representing the hand 1 detected on the image frame. Here, the identified position of the hand 1 may be two-dimensional information (e.g., xy coordinates). The processor 130 may estimate the direction of the hand 1 or the angle of the finger based on the hand 1 or finger included in the image frame. In this example, the processor 130 may estimate the coordinates of the points (e.g., points representing the joints of the hand 1) for measuring the size of the hand 1.

The processor 130 may combine the two-dimensional position information of the hand 1 with the z-axis value to obtain three-dimensional position information (e.g., xyz coordinate).

The processor 130 may compare the location on the three-dimensional space of the user's hand 1 and the location on the three-dimensional space of the AR content displayed on the display 110 to determine whether an interaction between the hand 1 and the AR content has occurred. For example, if the processor 130 compares the three-dimensional position information of the hand 1 and the three-dimensional position information of the AR content displayed on the display 110 and determines that the distance between the hand 1 and the AR content is less than a predetermined value, the processor 130 may identify that the interaction of the hand 1 with respect to the AR content is generated.

Hereinafter, a method of identifying the size of the hand 1 according to an embodiment will be described in greater detail.

According to an embodiment, the processor 130 may set the detected hand size to a predetermined value. In this example, the processor 130 may identify whether the interaction of the hand 1 with respect to the object provided through the display 110 is generated based on the size of the hand set to a predetermined value.

The predetermined value may be a value of a physical measurement unit (e.g., cm, etc.). For example, a predetermined value may be a value output through a trained AI model. The processor 130 may input the image frame into a trained AI model to set a preset value output from the trained AI model as the size of the detected hand. The trained AI model may be trained to output the size of the hand included in the image frame when the image frame including the hand of the user and the size of the hand included in the corresponding image frame are inputted as learning data.

For example, a predetermined value may be a value representing the average size of the user's hand. The users may be classified according to a specific group (e.g., gender, age, area, etc.). For example, the electronic apparatus 100 (or memory 160) may store information about the feature information of the user's hand 1 and the size (e.g., individual size, average size, etc.) of the hand 1 of the user, for a user belonging to each group (e.g., adult male, adult female, etc.). The feature information may include information on at least one of the ratio of the length of the finger constituting the hand 1, the roughness of the hand 1, the wrinkle of the hand 1, and the like. In this example, the processor 130 may compare the stored feature information of the hand 1 with the feature information of the hand 1 detected in the image frame to identify a group to which the detected hand 1 belongs. The processor 130 may determine the average size of the hand 1 of the users belonging to the identified group as a predetermined value and set the predetermined value as the size of the detected hand.

The size of the hand 1 according to an embodiment may be obtained based on information about an object when an interaction of the hand 1 with respect to an object provided through the display 110 is generated. When the interaction of the hand 1 with respect to the object provided through the display 110 is generated, the processor 130 may obtain the size of the hand 1 based on the information on the object in which the interaction has occurred. The processor 130 may correct the size of the hand 1 to a value obtained at a predetermined value. In this example, the processor 130 may identify whether an interaction of the hand 1 for the object provided through the display 110 has occurred based on the size of the hand 1.

The object may include at least one of a first type object included in the image frame obtained through the camera 120 and an object of a second type included in AR content displayed on the display 110. The object provided through the display 110 may be a first type object or a second type object.

More specifically, the object of the first type may refer to an object (e.g., a smartphone, a refrigerator, an elevator button, etc.) existing in the real space that may be captured through the camera 120.

For example, the first type object may be provided to the user in the form of being transmitted through the display 110, which is a transparent display. The display 110 may transmit light representing a first type object that exists outside the display 110. The first type object may be located in one direction (e.g., rear) opposite to the user located in one direction (e.g., front) based on the display 110 in the real space. In this example, the user may view the first type object through the light transmitted to the display 110.

For another example, a first type object may be provided to the user in the form of an image frame being displayed on the display 110. The display 110 may display an image frame obtained through the camera 120. An object of the first type may be included in the image frame. In this example, the user may view the first type object through the light emitted from the display 110 displaying the image frame.

The second type object may refer to a virtual object (e.g., a three-dimensional UI component, a widget, etc.) displayed on the display 110. The object of the second type may be described in the same way as the AR content described above.

The information about the object may include information about the size of the object (e.g., the horizontal length, longitudinal length, space, etc.), the distance between the object and the electronic apparatus 100, the information on the pixel size of the object included in the image frame, and their corresponding relationship. For example, the information on the object may indicate that the information located in the same row as in Table 1 is a relationship (or mapped relationship) corresponding to each other.

The interaction of the hand 1 with respect to the object may include at least one of an event in which the distance between the hand 1 and the object is below or equal to a predetermined value, an event in which the hand 1 contacts the object, an event in which the hand 1 holds the object, an event in which a screen displayed on a display (or LED, etc.) in an object existing around the position of the hand 1 is changed, or an event that the movement of the object existing around the position of the hand 1 starts or stops.

In an embodiment, the electronic apparatus 100 may further include a memory 160 (FIG. 13). The memory 130 may store feature information and size information of the reference object. The reference object may mean an object (e.g., a known object) in which feature information and size information are prestored. The feature information indicates unique information for identifying an object, and may include at least one of texture, scratch, shape, and the like.

If the object of the first type and the hand of the user are detected in the image frames obtained through the camera 120, the processor 130 may identify whether the object of the first type is the reference object based on the feature information stored in the memory 160 and the detected feature information of the first type object.

In this example, the processor 130 may identify the size of the hand 1 based on the size of the reference object if the first type object is identified as the reference object (i.e., if the object of the first type is a known object).

According to another embodiment, if it is identified that the first type object does not correspond to the reference object (that is, the first type object is an unknown object), the processor 130 may identify the size of the first type object included in consecutive image frames by using consecutive image frames obtained through the camera 120, based on the feature information stored in the memory 160 and the detected feature information of the first type object. In this example, the processor 130 may identify the size of the hand based on the size of the first type object.

According to an embodiment, the processor 130 may set the detected hand size to a predetermined value. In this example, the processor 130 may identify whether an interaction of a hand for a second type object provided through the display 110 is generated based on the set size. The processor 130 may identify the size of the hand based on the depth of the second type object in which the interaction of the hand is identified.

A method of identifying the size of the hand 1 according to various embodiments will be described.

Figure 4:
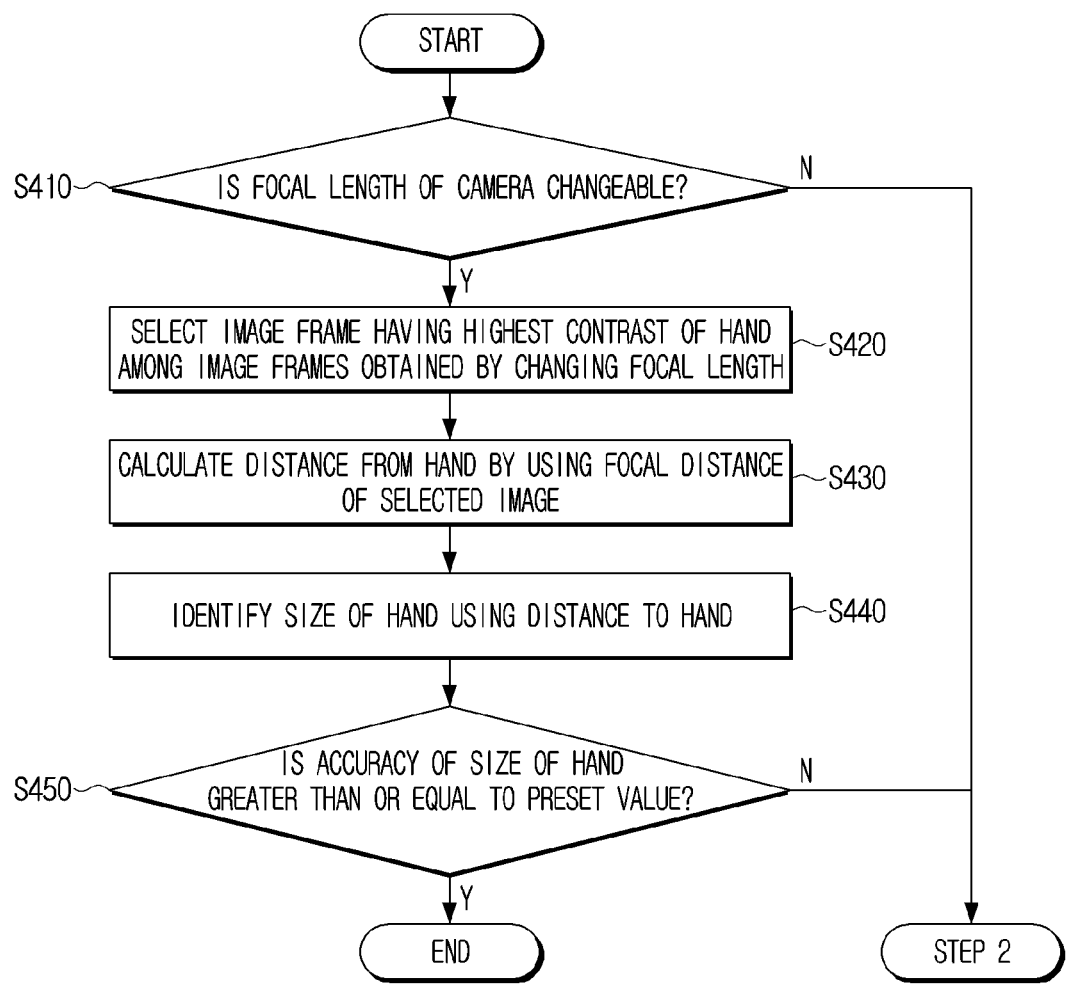
FIG. 4 is a diagram illustrating a method of identifying a size of a hand through a focal length according to an embodiment of the disclosure.

FIG. 4 is a diagram illustrating a method of identifying a size of a hand through a focal length according to an embodiment of the disclosure.

Referring to FIG. 4, in operation S410, the processor 130 may identify whether the focal length of the camera 120 may be changed based on the specification information of the camera 120. Here, the spec information of the camera 120 may include information on whether the focal length is variable and may be stored in the electronic apparatus 100.

If it is determined that the focal length of the camera 120 is not changeable in operation S410—N, the processor 130 may perform the method of step 2 of FIG. 7, which will be described later.

If it is determined that the focal length of the camera 120 may be changed in operation S410—Y, in operation S420, the processor 130 may select the image frame having the highest contrast of the hand 1 included in the obtained image frame by changing the focal length. In operation S430, the processor 130 may calculate the distance to the hand 1 using the focal distance of the selected image. This will be described with reference to FIGS. 5 and 6.

Figure 5:
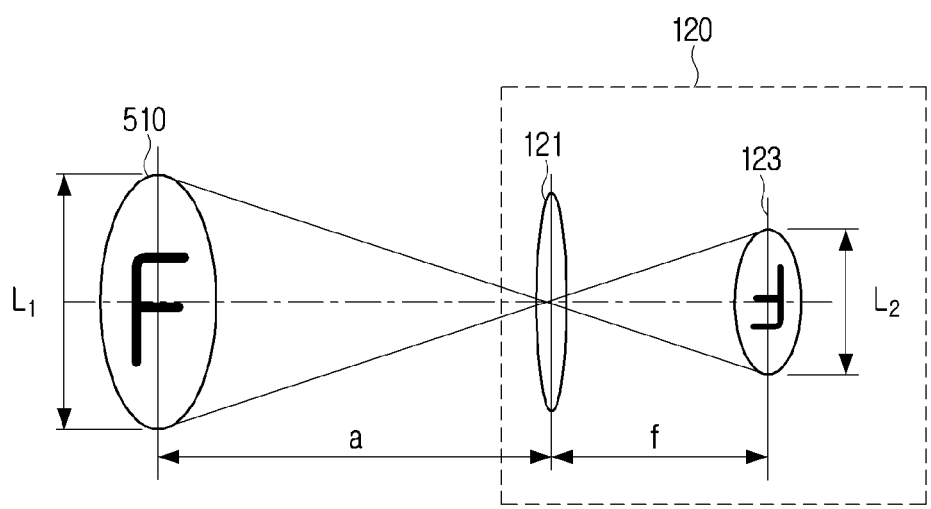
FIG. 5 is a diagram illustrating a relationship between a focal length and a focal distance according to an embodiment of the disclosure.
Figure 6A:
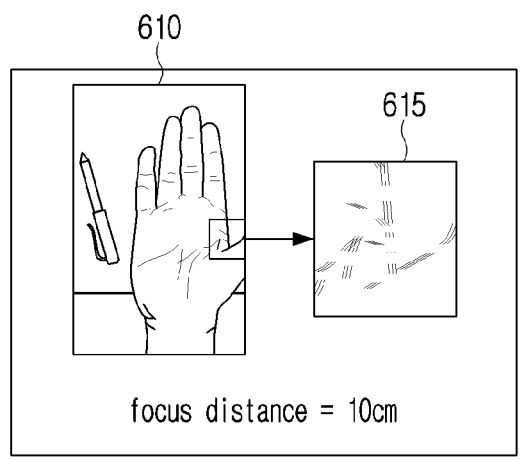
FIGS. 6A, 6B, and 6C are diagrams illustrating a method of identifying a size of a hand through a focal length according to an embodiment of the disclosure.
Figure 6B:
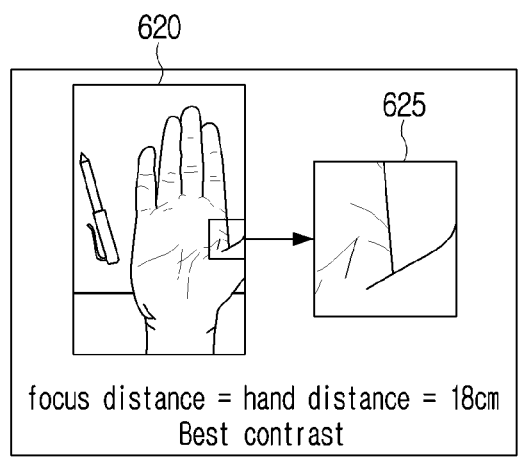
Figure 6C:
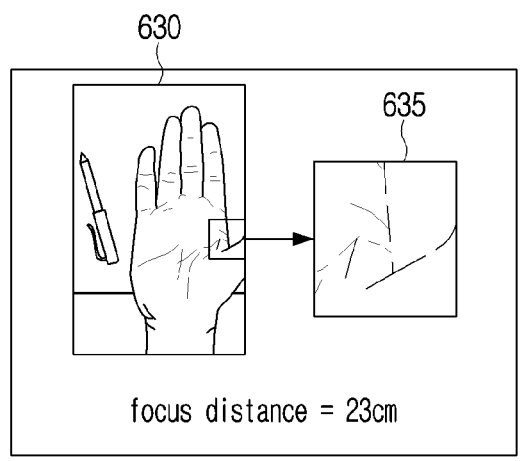

FIG. 5 is a diagram illustrating a relationship between a focal length and a focal distance according to an embodiment. FIGS. 6A, 6B, and 6C are diagrams illustrating a method of identifying a size of a hand through a focal length according to an embodiment.

Referring to FIG. 5, the camera 120 according to an embodiment may include at least one lens 121 and an image sensor 123. In this example, the camera 120 may capture the subject 510 (e.g., the hand 1 or the first type object, etc.) to obtain an image frame.

The processor 130 according to an embodiment may calculate the distance between the camera 120 and the subject 510 based on Equation (1) and Equation (2) of FIG. 5.

The focal distance a is the distance between the camera 120 and the subject 510 (e.g., a focused subject) (i.e., the focal distance between the lens 121 and the subject 510), and the focal length f is the distance between the lens 121 (e.g., the principal point of the lens 121) and the image sensor 123. In addition, L1 may represent the size (e.g., width or breadth) of the subject 510, and L2 may represent the size (e.g., width or breadth) of the image sensor 123. Here, if the focal length f is changed, the focal distance a may also be changed. The focal length f may be adjusted by an automatic method through the driving of the motor or by a manual method by a user.

Referring to FIGS. 6A, 6B, and 6C, when it is determined that the focal length f of the camera 120 is changeable in operation S410—Y, the processor 130 may change the focal length f (or the focal distance a) to obtain image frames 610, 620, and 630. For example, the image frame 610 of FIG. 6A may have a focal length of 10 cm, the image frame 620 of FIG. 6B may have a focal length of 18 cm, and the image frame 630 of FIG. 6C may have a focal length of 23 cm.

The processor 130 may select the image frame having the highest contrast among the image frames 610, 620 and 630 having different focal distance (or focal lengths). For example, the processor 130 may detect an area representing a hand from the image frames 610, 620 and 630, and compare the detected regions 615, 625, and 635 with a hand model previously stored in the electronic apparatus 100 to determine contrast. The contrast may mean a sharpness (or degree of haze), the higher the contrast, the hand 1 will be clearly captured, and the higher the contrast, the better the hand 1 is focused. The processor 130 may determine that the contrast ratio of the area 625 indicating the detected hand in the image frame 620 of FIG. 6B is highest among the determined contrast, and may identify that the focus distance 18 cm of the image frame 620 selected as the image frame having the highest contrast as the distance to the hand 1.

Referring back to FIG. 4, in operation S440, the processor 130 may calculate the size of the hand 1 using the distance to the hand 1.

For example, the processor 130 may prestore, for the hand 1 having a real measurement size (e.g., 20 cm), the corresponding relationship between the distant distance between the hand 1 and the electronic apparatus 100 (e.g., 0.5 meters . . . 1 meter) and the size of the hand 1 (e.g., pixel number 100, 50 . . . ) included in the image frame obtained through capturing from the corresponding distance in the electronic apparatus 100 or the memory 160. In this example, if the processor 130 may, if the distance of the hand 1 (or object) is known, calculate the size of the hand 1 (or object) through the distance of the hand 1 (or object) included in the image frame based on a pre-stored corresponding relationship.

In operation S450, the processor 130 may calculate the accuracy of the calculated size of the hand 1. The processor 130 may update the size and accuracy of the hand 1 when the calculated accuracy is greater than or equal to a predetermined value in operation S450-Y. Alternatively, when the calculated accuracy is less than a predetermined value in operation S450-N, the method of step 2 of FIG. 7 may be performed, which will be described later.

Figure 7:
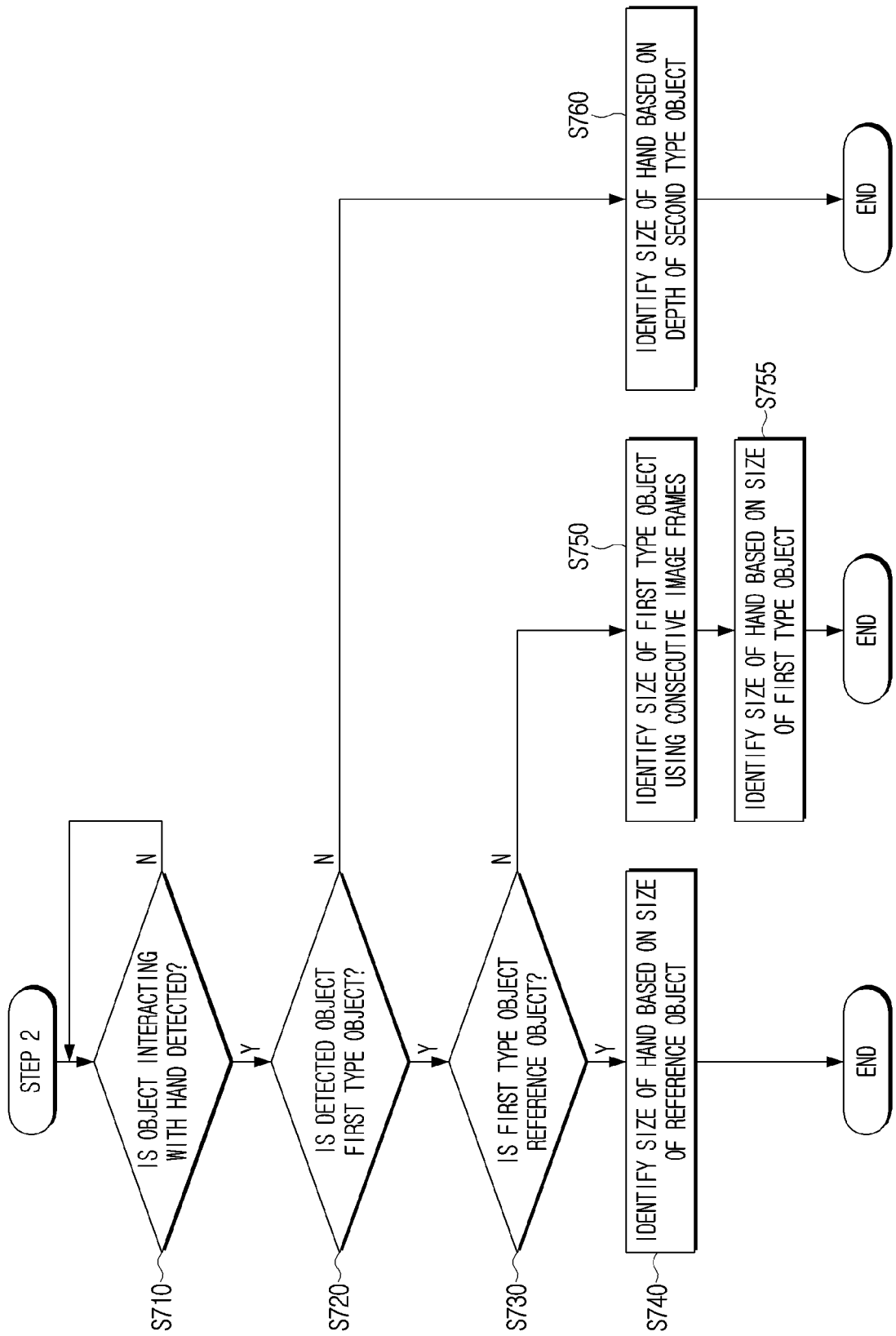
FIG. 7 is a diagram illustrating a method of identifying a hand size through an object interacting with a hand according to an embodiment of the disclosure.

FIG. 7 is a diagram illustrating a method of identifying a hand size through an object interacting with a hand according to an embodiment of the disclosure.

Referring to FIG. 7, in operation S710, the processor 130 may determine whether an object interacting with the hand 1 is detected among the objects provided through the display 110. The object provided through the display 110 may include at least one of a first type object included in the image frame obtained through the camera 120 and an object of a second type included in AR content displayed on the display 110. The interaction will be described with reference to FIGS. 8A, 8B and 8C.

Figure 8B:
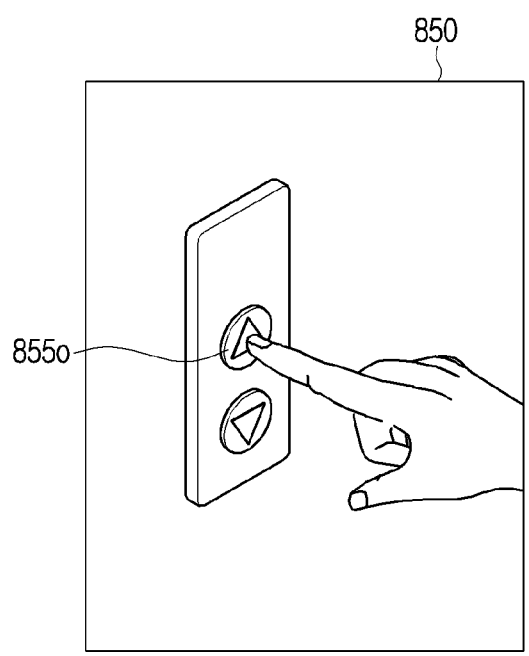
FIGS. 8B and 8C are diagrams illustrating a method of detecting an object interacting with a hand according to an embodiment of the disclosure.
Figure 8C:
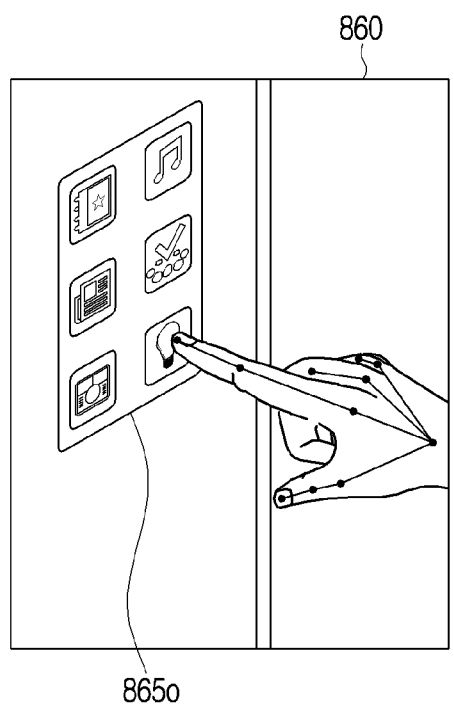

FIG. 8A is a diagram illustrating a method of detecting an object interacting with a hand according to an embodiment of the disclosure. FIGS. 8B and 8C is a diagram illustrating a method of detecting an object interacting with a hand according to an embodiment of the disclosure.

Referring to FIG. 8A, the processor 130 according to an embodiment may sequentially obtain image frames 810, 820, 830, 840 through the camera 120.

The processor 130 may detect feature information in an obtained image frame 810, and detect regions 811$h$, 813$h$, and 815$h$ representing the user's hand 1 through feature information and regions 811$o$, 813$o$, 815$o$ representing the object.

The image frame 810 may include at least one of the image frames 811, 813, and 815. The image frame 811 indicates that the position of the hand 1 is in front of the object (i.e., if the distance between the hand 1 and the electronic apparatus 100 is greater), the image frame 813 indicates that the position of the hand 1 is behind the object (i.e., if the distance between the hand 1 and the electronic apparatus 100 is smaller), the image frame 815 indicates that the position of the hand 1 (i.e., the finger) is between the object (i.e., if the distance between the hand 1 and the electronic apparatus 100 is equal to the distance between the object and the electronic apparatus 100). The feature information is information indicating a unique feature used to identify a hand 1 or an object in an image frame, and the feature information may include information on texture, color, shape, and the like.

The processor 130 may detect feature information in the obtained image frame 820, and detect a region 825$h$ representing the user's hand 1 and an area 825$o$ representing the object through the feature information. The processor 130 may compare the sequentially obtained image frame 810 and the image frame 820 to determine whether an object starts or stops movement.

The processor 130 may detect feature information in the obtained image frame 830 and detect a region 835$h$ indicating the user's hand 1 through the feature information. The processor 130 may compare the sequentially obtained image frame 820 and the image frame 830 to determine whether the object is located under the hand 1 of the user (e.g., a shadow portion).

The processor 130 may detect feature information in the image frame 840 obtained through the camera 120 and detect a region 845$h$ indicating the user's hand 1 through the feature information. The processor 130 may compare the sequentially obtained image frame 830 and the image frame 840 to determine whether the hand 1 of the user holds the object through a change in the shape of the hand 1 of the user. When it is determined that the user's hand 1 holds the object, the processor 130 may determine that the user's hand 1 interacts with the object.

Referring to FIGS. 8B and 8C, the processor 130 according to an embodiment may include image frames 850, 860 through the camera 120.

For example, the processor 130 may detect feature information in the image frame 850 of FIG. 8B, and detect an area and an object (e.g., an elevator button) representing the user's hand 1 through the feature information. The processor 130 may determine that the user's hand 1 interacts with the object when the change of the region 855*o* indicating the object (e.g., the LED of the elevator button is turned on) through the obtained image frame is detected.

For another example, the processor 130 may detect feature information in the image frame 860 of FIG. 8C, and detect an area representing the user's hand 1 and an area 865*o* representing an object (e.g., a display of the refrigerator) through the feature information. Further, the processor 130 may determine that the user's hand 1 interacts with the object when the change of the region 865*o* representing the object (e.g., the image displayed on the display of the refrigerator is changed) is sensed through the sequentially obtained image frame.

Referring back to FIG. 7, when an object interacting with the hand 1 is detected in operation S710-Y, in operation S720, the processor 130 may determine whether the detected object corresponds to the first type object. Alternatively, the processor 130 may determine whether the detected object corresponds to a second type object. The object of the first type may refer to an object (e.g., a smartphone, a refrigerator, an elevator button, etc.) existing in the real space that may be captured through the camera 120. The second type object may refer to a virtual object (e.g., a three-dimensional UI component, a widget, etc.) displayed on the display 110.

For example, the processor 130 may compare the position of the hand 1 included in the image frame and the position of the at least one first type object in an image frame obtained through the camera 120. The processor 130 may detect a first type object having a distance equal to or less than a predetermined value from among at least one first type object as an object interaction with the hand 1. In this example, in operation S720—Y, the processor 130 may determine whether the detected first type object is the reference object.

If the detected type object is the first type object in operation S720—Y, in operation S730, the processor 130 may determine whether the detected first type object is the reference object. The reference object may mean an object in which the feature information and the size information are pre-stored in the memory 160.

For example, the processor 130 may compare the feature information of the plurality of reference objects stored in the memory 160 and the detected feature information of the detected first type object to calculate the similarity of each reference object and the detected first type object. The processor 130 may detect that the reference object having the highest similarity is greater than a predetermined value among the plurality of reference objects.

In operation S740, the processor 130 may identify the size of the hand 1 based on the size of the reference object (i.e., if the object of the first type is a known object) in operation S730-Y. For example, the processor 130 may identify the detected first type object as the detected reference object when the reference object having the highest similarity is detected that is greater than or equal to a predetermined value. Various embodiments will be described with reference to FIGS. 9A and 9B.

Figure 9A:
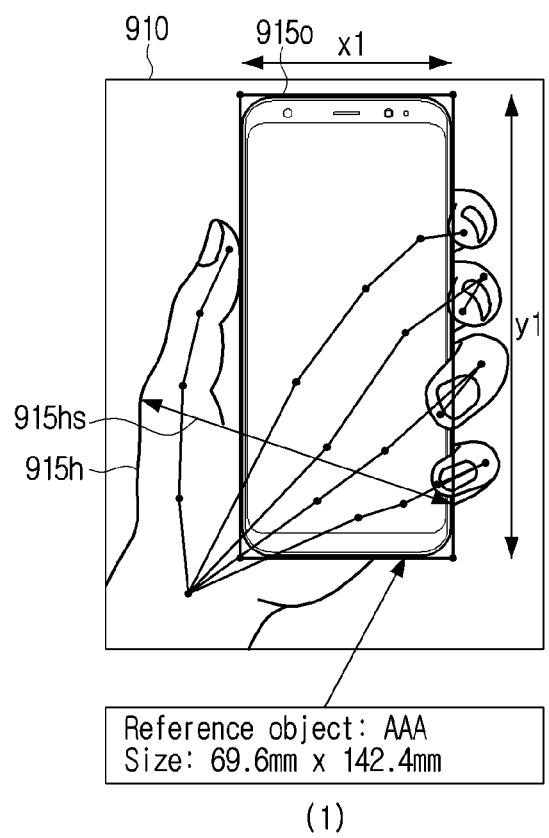
FIGS. 9A and 9B are diagrams illustrating a method of identifying a size of a hand through an object of a first type according to an embodiment of the disclosure.
Figure 9B:
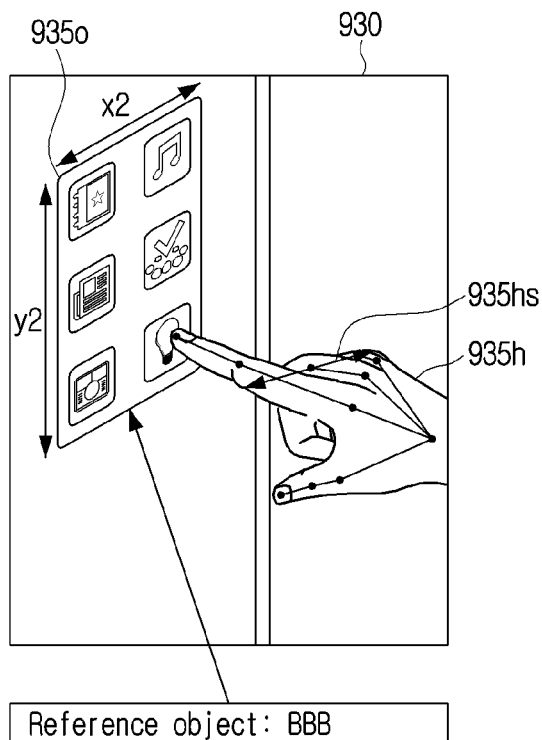

FIGS. 9A and 9B are diagrams illustrating a method of identifying a size of a hand through an object of a first type according to an embodiment.

Referring to FIGS. 9A and 9B, the processor 130 according to an embodiment may obtain image frames 910 and 930 through the camera 120.

As shown in FIG. 9A, the processor 130 may detect feature information from the obtained image frame 910, and detect a region 915*h* indicating the hand 1 of the user or a region 915*o* indicating the object of the first type through the feature information.

In this example, if it is determined that the distance between the area 915*h* representing the hand 1 of the user and the area 915*o* representing the object of the first type is below or equal to a predetermined value, the processor 130 may determine that an interaction of user's hand 1 and the object of the first type occurs.

In this example, the processor 130 may compare the feature information included in the area 915*o* representing the first type object and the feature information of the plurality of reference objects stored in the memory 160 to determine whether the object of the first type is the reference object. FIG. 9A illustrates a case where an object of a first type included in an image frame is a reference object (e.g., Galaxy S7 in the size of 69.6 mm width×142.4 mm height).

In this example, the processor 130 may identify the size of the hand 1 based on the size of the reference object, the pixel size X1, Y1 of the reference object, and the pixel size 915*hs* of the hand 1. For example, the processor 130 may calculate the size of the hand through a ratio relationship as shown in Equation (3).

Reference object size/pixel size of the reference object=size of the hand/pixel size of the hand   [Equation 3]

The above-described manner may be equally applied to the case of FIG. 9B. That is, if it is determined that the distance between the region 935*h* indicating the hand 1 of the user included in the obtained image frame 930 and the region 935*o* representing the object of the first type is less than or equal to a predetermined value, the processor 130 may determine that the interaction of the user's hand 1 with respect to the object of the first type has occurred.

In this example, the processor 130 may compare the feature information included in the area 935*o* representing the first type object and the feature information of the plurality of reference objects stored in the memory 160 to determine whether the object of the first type is the reference object. FIG. 9B illustrates a case where an object of a first type included in an image frame is a display of a reference object (e.g., a display of a refrigerator having a size of 120 mm width×205 mm height).

In this example, the processor 130 may identify the size of the hand based on the size of the reference object, the pixel size X2, Y2 of the reference object, and the pixel size 935*hs* of the hand.

According to an embodiment, when the image frame is obtained through the camera 120, the processor 130 may identify at least one first type object (or reference object) included in the obtained image frame, and then, when the hand of the user is detected, may identify an object in which the interaction has occurred with the detected hand among the at least one first type object.

Alternatively, referring again to FIG. 7, in operation S750 the processor 130 may identify the size of the first type object included in consecutive image frames by using the consecutive image frames obtained through the camera 120 when it is identified that the first type object does not correspond to the reference object (that is, when the first type is an unknown object) in operation S730-N based on the feature information stored in the memory 160 and the feature information of the detected first type object.

For example, if the reference object having a similarity equal to or greater than a predetermined value is not detected, the processor 130 may identify that the object of the first type does not correspond to the reference object.

In this example, the processor 130 may use consecutive image frames obtained through the camera 120 to identify a size of a first type object included in consecutive image frames. In operation S755, the processor 130 may identify the size of the hand based on the size of the object of the first type. Various embodiments will be described with reference to FIG. 10.

Figure 10:
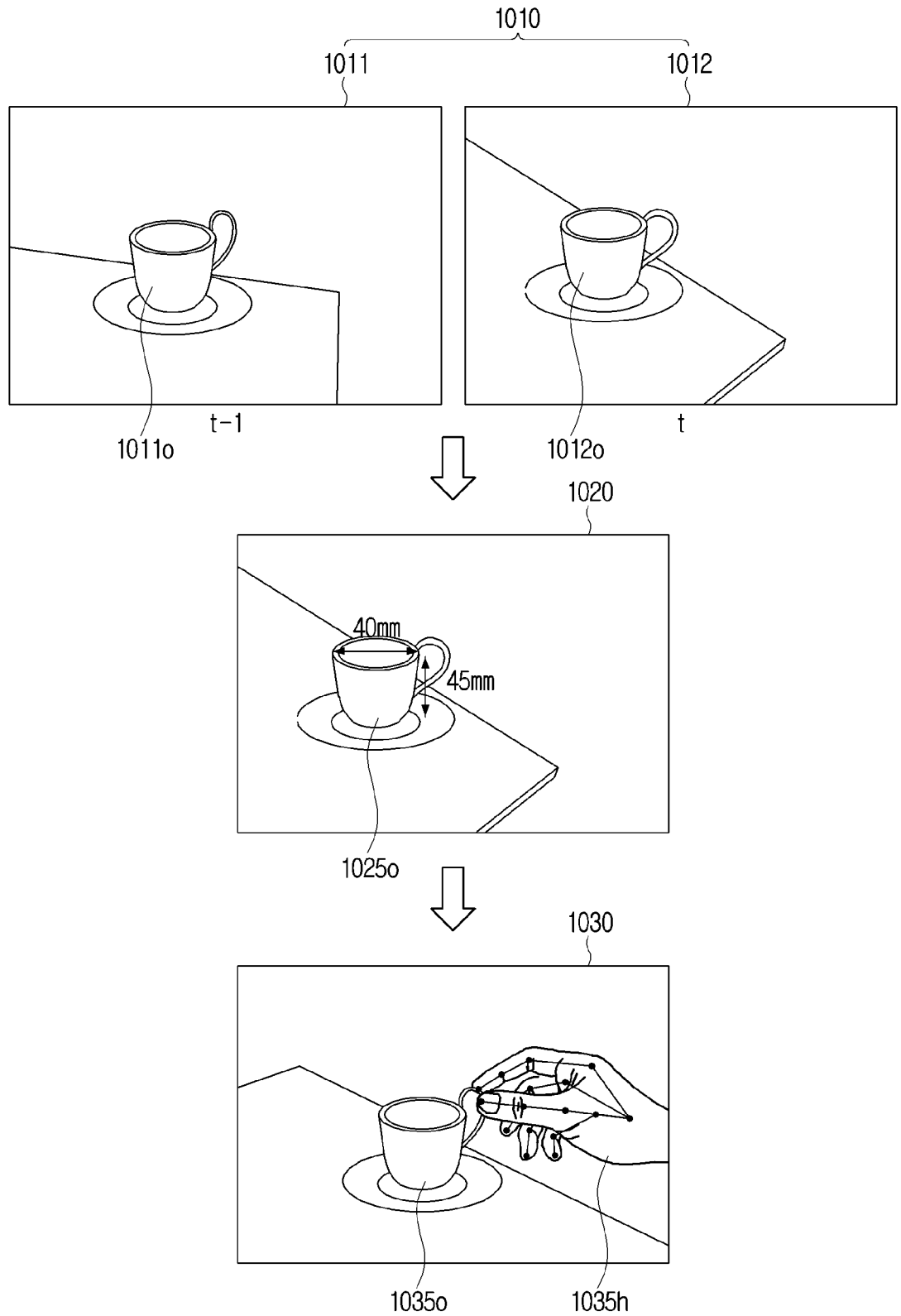
FIG. 10 is a diagram illustrating a method of identifying a size of a hand through an object of a first type according to an embodiment of the disclosure.

FIG. 10 is a diagram illustrating a method of identifying a size of a hand through an object of a first type according to an embodiment of the disclosure. FIG. 10 is a diagram illustrating that the first type object is not a reference object.

Referring to FIG. 10, the processor 130 may obtain the image frames 1010, 1020, and 1030 through the camera 120. The processor 130 may detect feature information from the obtained image frames 1010, 1020, and 1030, and detect a region 1035h representing the hand 1 of the user or a region 1011o, 1012o, 1025o, and 1035o representing the first type object through the feature information.

It is assumed that the processor 130 identifies that the first type object included in the image frames 1010, 1020, and 1030 does not correspond to the reference object. In this example, the processor 130 may measure the size of a first type object included in the image frames 1010, 1020, and 1030 through a simultaneous localization and mapping (SLAM) scheme.

The image frame 1011 and the image frame 1012 represent a continuously obtained image frame having a very small captured time interval (e.g., 5 ms, etc.) (i.e., the relationship of the $t^{th}$ obtained image frame 1011 following the $t-1^{th}$ obtained image frame 1011), and the plurality of image frames 1010 through 1030 represent an image frame having a large captured time interval (e.g., 2 seconds, etc.).

The processor 130 may compare the obtained two image frames 1011, 1012 which are sequentially captured and obtained while the camera 120 is moving (or during rotation) to determine the distance of the center position of the regions 1011o, 1012o representing the first type object is moving. In this example, the processor 130 may obtain a degree of movement (e.g., a moving distance, or a rotation angle) of the camera 120 during a time of capturing of the camera 120 through a separate sensor (e.g., an acceleration sensor, etc.) provided in the electronic apparatus 100.

The processor 130 may identify a distance (e.g., a distance between the object and the electronic apparatus 100) that corresponds to the degree of movement (e.g., a movement distance, or a rotation angle) and center position of regions 1011o, 1012o that is representing the first type object while the camera 120 is moving (or rotating). The electronic apparatus 100 may prestore information about the rotation angle of the electronic apparatus 100 and the distance which matched to moving distance of center position of the electronic apparatus 100. When the camera 120 moves, the object may move on the image frame obtained through the camera 120. In this case, although the camera moves at the same distance, the degree which the center position of the object is moving on the image frame may be vary.

When the distance between the camera 120 and the object is identified through the image frame 1010, the processor 130 may identify a pixel size (e.g., a horizontal pixel, a vertical pixel, etc.) of the region 1025o indicating the object of the first type in the obtained image frame 1020 after the distance is identified. The processor 130 may identify a size of an object (e.g., a real size of 40 mm width, 45 mm height) corresponding to a pixel size of the object and a distance of the object. In this example, the processor 130 may identify the distance of the object and the size of the object mapped to the pixel size of the object by using information about the object (e.g., the size of the object, the distance of the object, information on the pixel size of the object included in the image frame, and information on their corresponding relationship (e.g., Table 1).

The processor 130 may determine that the interaction has occurred for the user's hand 1 with respect to the object when the distance between the region 1035h representing the hand 1 of the user and the region 1035o representing the object of the first type is less than a predetermined value in the image frame 1030.

In one embodiment, the processor 130 may estimate the distance (e.g., a distance between the object and the camera 120) of the object to a distance (e.g., a distance between the hand 1 and the camera 120) of the user. In this example, the processor 130 may identify the size of the hand 1 corresponding to the distance of the hand 1 and the pixel size of the user's hand 1 through a corresponding relationship as in Table 1.

In one embodiment, the processor 130 may identify the size of the hand 1 based on the size of the object, the pixel size of the object, and the pixel size of the hand 1, in a manner similar to Equation (3).

Referring back to FIG. 7, for example, the processor 130 may compare the position of the hand 1 included in the image frame obtained through the camera 120 and the position of at least one second type object displayed through the display 110. The processor 130 may detect a second type object having a distance equal to or less than a predetermined value from among at least a second type object as an object having interaction with the hand 1.

In this example in operation S720-N, in operation S760, the processor 130 may identify the size of the hand based on the detected depth of the object of the second type.

The processor 130 may set the detected hand size to a predetermined value. The depth value of the detected second type object may be considered the distance value of the hand 1 (e.g., the distance between the electronic apparatus 100 and the hand 1 (i.e., the length on the z axis)). In this example, the processor 130 may obtain the size of the hand 1 corresponding to the pixel size of the pixel representing the hand 1 among the plurality of pixels included in the image frame and the distance value of the hand 1, as in the embodiment of Table 1. The processor 130 may obtain three-dimensional position information of the hand 1 by combining the position information (i.e., the coordinate on the xy-axis) indicating the hand 1 among the pixels of a plurality of pixels included in the image frame and the distance value (e.g., the length of the z-axis) of the hand 1. Various embodiments will be described with reference to FIG. 11.

Figure 11:
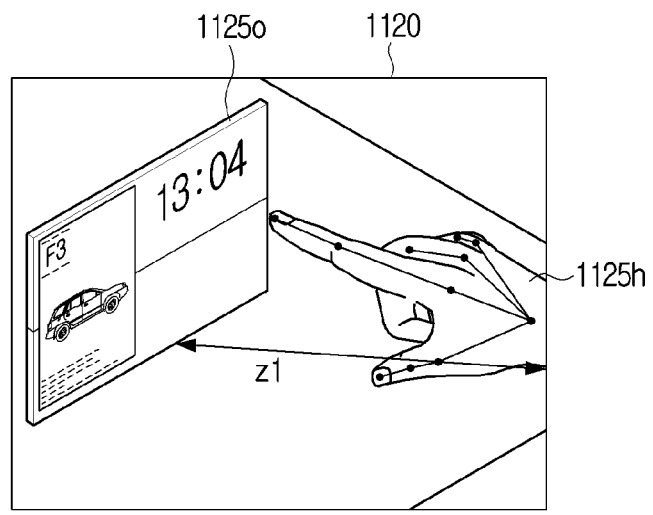
FIG. 11 is a diagram illustrating a method of identifying a hand size through an object of a second type according to an embodiment of the disclosure.

FIG. 11 is a diagram illustrating a method of identifying a hand size through an object of a second type according to an embodiment of the disclosure.

Referring to FIG. 11, an image 1120 may be provided through the display 110 according to an embodiment. The image 1120 may include at least one of an image in which the image frame obtained through the camera 120 and a virtual second type object 1125o are overlapped and displayed on the display 110, or an image in which external environment is transmitted on the display 110 and the virtual second type object 1125o is overlapped with the external environment and displayed on the display 110.

The processor 130 may control the display 110 to display the second type object (or AR content) 1125o on a specific position on the virtual 3D space. The second type object 1125o may include 3D position information (e.g., xyz coordinate).

The processor 130 may obtain an image frame through the camera 120. The processor 130 may detect feature information in the obtained image frame and detect a region 1125h indicating the user's hand 1 through the feature information. The processor 130 may set the detected hand size to a predetermined value (e.g., an average value for the user's hand). In this example, the processor 130 may identify the size of the user's hand 1 and the distance of the hand 1 of the user corresponding to the pixel size of the hand 1 through a corresponding relationship as in Table 1. The processor 130 may identify three-dimensional position information of the hand 1 by combining the xy coordinate and distance of the hand 1 on the image frame.

The processor 130 may compare the three-dimensional position of the hand 1 and the object 1125o of the second type to determine that an interaction with respect to the second type object 1125o of the hand 1 is generated when the distance between the hand 1 and the object 1125o of the second type is less than a predetermined value.

The processor 130 may estimate (or correct) the distance value on the z-axis of the second type object 1125o as a distance on the z-axis of the hand 1 if it is determined that the interaction with the second type object 1125o of the hand 1 has occurred. The distance (e.g., the distance on the z-axis) of the hand 1 may be readjusted.

In this example, the processor 130 may identify the size of the hand 1 corresponding to the readjusted distance of the hand 1 and the pixel size of the hand 1 through the corresponding relationship in Table 1. The size of the hand 1 may be corrected to the identified value at a predetermined value.

According to an embodiment, the electronic apparatus 100 may store and manage the size of the user's hand 1 for each user account. The electronic apparatus 100 may store (or update) the size of the hand 1 of a particular user together with the user account of the corresponding user. The electronic apparatus 100 may then access the user account to load the size of the hand 1 stored together in the user account. To access a particular user account, the electronic apparatus 100 may perform an authentication process. For example, the electronic apparatus 100 may access a user account corresponding to the password when a pre-registered password (e.g., character, number, symbol, pattern, gesture, etc.) is input. As another example, the electronic apparatus 100 may access a user account corresponding to the biometric information when the pre-registered biometric information (e.g., fingerprint, retina, face, hand shape, etc.) is input.

Figure 12A:
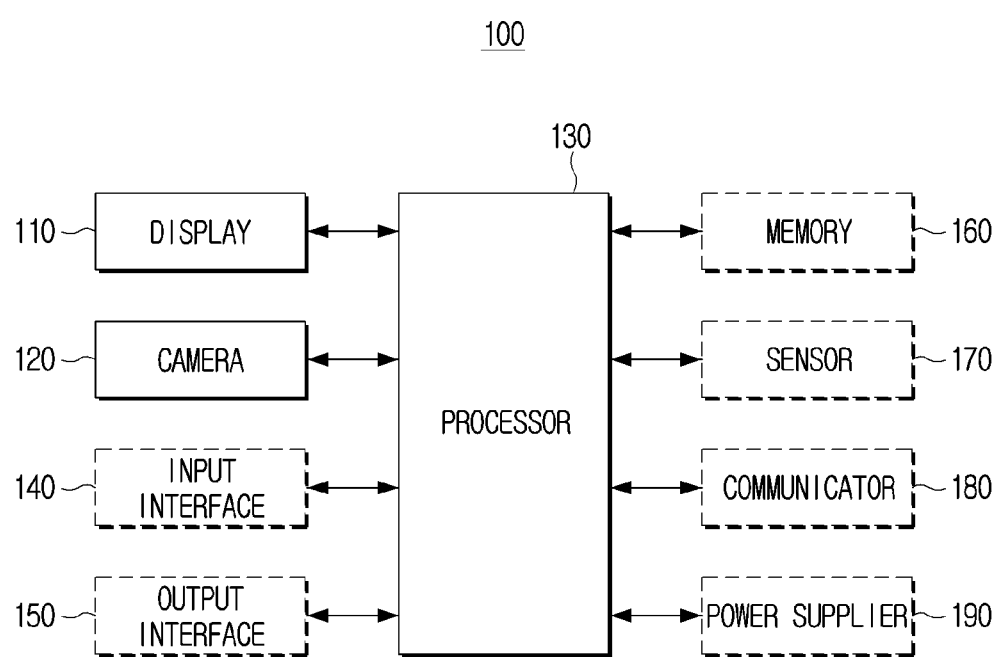
FIG. 12A is a diagram illustrating an additional configuration of an electronic apparatus according to an embodiment of the disclosure.

FIG. 12A is a block diagram illustrating an additional configuration of an electronic apparatus according to an embodiment of the disclosure.

Referring to FIG. 12A, in addition to the display 110, the camera 120, and the processor 130, the electronic apparatus 100 may further include at least one of an input interface 140, an output interface 150, a memory 160, a sensor 170, a communicator 180, and a power supplier 190.

The input interface 140 may receive various user commands and pass the same to the processor 130. The processor 130 may recognize a user command input from a user through the input interface 140. Here, the user command may be implemented in various ways, such as a user's touch input (e.g., via a touch panel), an input of pressing a key or a button, input of a voice uttered by a user, or the like.

The output interface 150 may further include a speaker. The speaker may directly output various notification sound or voice messages as well as various audio data for which various processing has been performed, such as decoding or amplification, noise filtering, etc., by an audio processor as voice.

The memory 160 is configured to store various data related to components of the operating system (OS) and electronic apparatus 100 to control the overall operation of the components of the electronic apparatus 100.

The memory 160 may include hardware that temporarily or permanently stores data or store. For example, the memory 160 may be implemented as at least one hardware among a non-volatile memory, a volatile memory, a flash memory, a hard disk drive (HDD) or solid state drive (SSD), RAM, ROM, or the like.

The sensor 170 may be implemented with various sensors, such as a camera, a microphone, a proximity sensor, an illuminance sensor, a motion sensor, a ToF sensor, a global positioning system (GPS) sensor, and the like. For example, the camera may divide the light in pixel units, detect the intensity of light for red (R), green (G), and blue (B) for each pixel, and convert the intensity of the light into an electrical signal to obtain data representing the color, shape, contrast, or the like, of the object. At this time, the type of data may be an image having R, G, and B color values for each of the plurality of pixels. The microphone may sense a sound wave, such as a voice of a user, and convert the sound wave into an electrical signal to obtain data. At this time, the type of data may be an audio signal in various formats. The proximity sensor may sense the presence of the surrounding object to obtain data about the presence of a surrounding object or the proximity of the surrounding object. The illuminance sensor may sense light quantity (or brightness) relative to the surrounding environment of the electronic apparatus 100 to obtain data for the illuminance. The motion sensor can sense movement distance, movement direction, incline, or the like, of the electronic apparatus 100. The motion sensor may be implemented in a combination of an acceleration sensor, a gyro sensor, a geomagnetic sensor, or the like. A TOF sensor may detect a flight time of emitting and returning the various electromagnetic waves (e.g., ultrasound, infrared, laser, ultra-wideband (UWB) etc.) having a specific speed, and may obtain data with respect to a distance (or location) with the object. The GPS sensor may receive a radio wave signal from a plurality of satellites, calculate a distance with each satellite by using a transmission time of the received signal, and obtain data for the current location of the electronic apparatus 100 by using the calculated distance through triangulation. The above-described implementation embodiment of the sensor 170 is only one embodiment, and it is not limited thereto, and it is possible to implement various types of sensors.

The communicator 180 may communicate with various types of external devices according to various types of communication methods to transmit and receive various types of data. The communicator 180 is a circuit that performs various types of wireless communication, such as Bluetooth module (Bluetooth or Bluetooth low energy), Wi-Fi module (Wi-Fi method), wireless communication module (cellular such as 3$^{rd}$ generation (3G), 4$^{th}$ generation (4G), 5$^{th}$ generation (5G)), near field communication (NFC), infrared modules (infrared method), Zigbee modules (Zigbee method), Ethernet module performing wireless communication with UWB and ultrasonic modules (ultrasonic method), universal serial bus (USB) module, high definition multimedia interface (HDMI), display port (DP), D-subminiature (D-SUB), digital visual interface (DVI), Thunderbolt, or components.

The power supplier 190 may supply or block power to each configuration of the electronic apparatus 100. The power supplier 190 may include a battery for supplying power, and the battery may be charged according to a wired charging method or a wireless charging method.

Figure 12B:
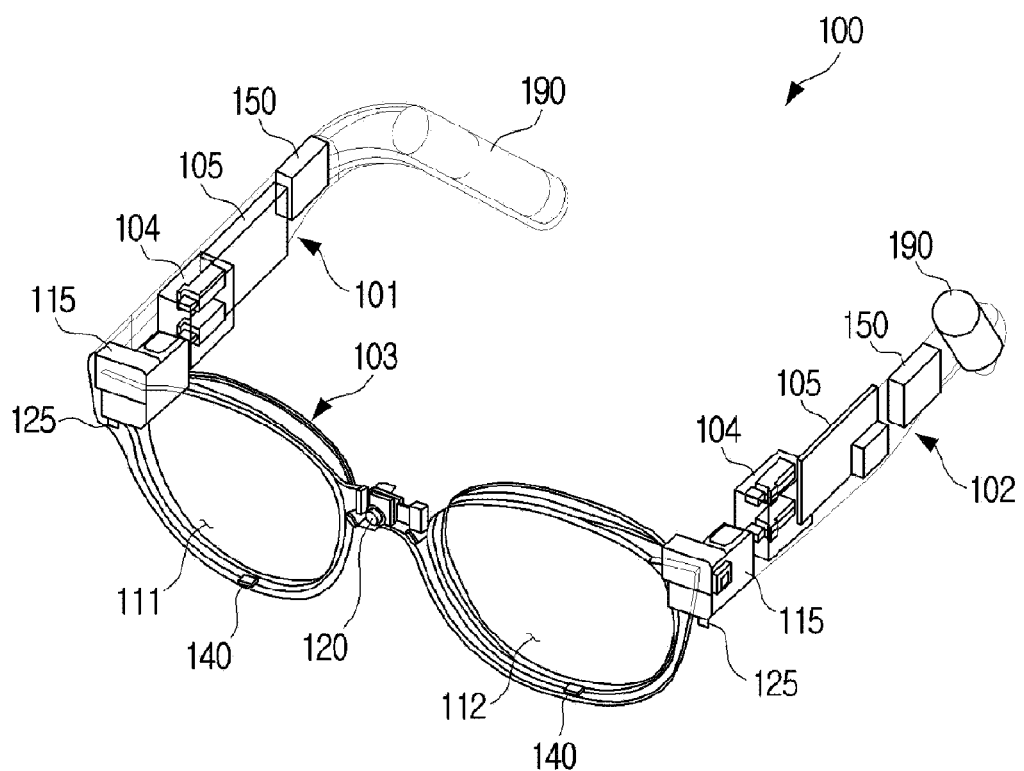
FIG. 12B is a diagram illustrating an example of an electronic apparatus according to an embodiment of the disclosure.

FIG. 12B is a diagram illustrating an example of an electronic apparatus according to an embodiment of the disclosure.

Referring to FIG. 12B, the electronic apparatus 100 according to various embodiments may be implemented in the form of glasses. However, this is merely an example, and the electronic apparatus 100 may be implemented as various types of electronic apparatuses such as goggles, helmet, hat, smartphone, and the like.

In various embodiments, the electronic apparatus 100 may be worn on a user's head portion to provide an image related to the augmented reality service to the user. According to an embodiment, the electronic apparatus 100 may provide an augmented reality service which outputs so that at least one virtual object is seen to be overlapped in an area determined as a field of view of a user. For example, a region determined as a field of view of a user may refer to an area that a user wearing the electronic apparatus 100 may recognize through the electronic apparatus 100.

The electronic apparatus 100 according to an embodiment may be divided into a support portion (e.g., a first support portion 101, and/or a second support portion 102) and a main body portion 103. The main body portion 103 and the support portions 101 and 102 of the electronic apparatus 100 may be operatively connected. For example, the main body portion 103 and the support portions 101 and 102 may be operatively connected through a hinge portion 104. The main body portion 103 may be mounted on the nose of the user, and may include at least one glass 111, 112, a display module 115, and the camera 120. The support portions 101, 102 may include a support member mounted on the ear of the user, and may include a first support 101 mounted on the left ear and/or a second support 102 mounted to the right ear.

The electronic apparatus 100 may include a plurality of glasses (e.g., the first glass 111 and the second glass 112) corresponding to each of the user's eyes (e.g., left-eye and right-eye).

For example, each of the plurality of glasses 111, 112 may function as the display 110 described above. Each of the plurality of glasses 111 and 112 may include at least one of an LCD, a digital mirror device (DMD), a liquid crystal on silicon (LCoS), an OLED, and a micro LED. In this example, the electronic apparatus 100 may drive the display panel to display an image. Each of the plurality of glasses 111 and 112 may function as a single transparent display.

In another embodiment, the display 110 may display an image by a projector scheme. The display 110 may include a display module 115 (e.g., a projector, a backlight unit, etc.) for providing light corresponding to an image to user's eyes. In this example, the display module 115 may be located on a side surface of each of the glasses 111 and 112, a connection part of each of the glass 111 and 112, or the like, but may be variously modified.

More specifically, according to one embodiment, the electronic apparatus 100 may include at least one glass (e.g., the first glass 111 and the second glass 112). The at least one glass (e.g., the first glass 111 and the second glass 112) may include a condensing lens (not shown) and/or a transparent waveguide. For example, the transparent waveguide may be located in at least a portion of the glass. According to an embodiment, the light emitted from the display module 115 may be incident on one end of the glass through the first glass 111 and the second glass 112, and the incident light may be transmitted to the user through a waveguide and/or an optical waveguide (e.g., waveguide) formed in the glass. The waveguide may be made of glass, plastic, or polymer, and may include a nano pattern formed on the inner or outer surface thereof, for example, a polygonal or curved grating structure. According to one embodiment, the incident light may be propagated or reflected inside the waveguide by the nano pattern to be provided to the user. According to one embodiment, the waveguide may include at least one of at least one diffractive element (e.g., diffractive optical element (DOE), holographic optical element (HOE)), or reflective element (e.g., reflective mirror, total internal reflection (TIR) member, etc.). According to one embodiment, the optical waveguide may induce the light emitted from the light source unit to the eye of the user using at least one diffractive element or reflective element.

According to an embodiment, each of the plurality of glasses 111 and 112 may be formed of a transparent material to transmit external light. A user may view a real space or an external object through the plurality of glasses 111 and 112. The electronic apparatus 100 may display a virtual object in at least a portion of the display 100 (e.g., at least one of the plurality of glasses 111, 112) such that the user may view that a virtual object is added to at least a portion of the real space.

According to an embodiment, the virtual object output through the display 110 may include information related to an application program executed in the electronic apparatus 100 and/or information related to an external object located in a real space corresponding to an area determined as a field of view of the user. For example, the electronic apparatus 100 may identify an external object included in at least a part of the image information associated with a real space obtained through the camera 120 of the electronic apparatus 100. The electronic apparatus 100 may output (or display) a virtual object associated with an external object identified by at least a part of the display area of the electronic apparatus 100 through an area determined as a field of view of a user. The external object may include objects existing in the real space.

According to an embodiment, the electronic apparatus 100 may further include the camera 120 for capturing an image corresponding to a field of view of the user, and an eye tracking camera for checking the direction of the gaze viewed by the user. For example, the camera 120 may capture a front direction of the electronic apparatus 100, and the gaze tracking camera may capture a direction opposite to the capturing direction of the camera 120 (i.e., a direction in which eyes of a user wearing the electronic apparatus 100 are located). For example, the gaze tracking camera may capture the eyes of the user.

According to an embodiment, the electronic apparatus 100 may include at least one illumination LED module 125. For example, the light emitting device 125 may emit light. The light emitting device 125 may be used as an auxiliary means for improving the accuracy of an image obtained by the camera 120 by providing light to an environment having a low illuminance.

According to an embodiment, each of the first support portion 101 and the second support portion 102 may include at least one of the input interface 140, a printed circuit board (PCB) 105, the output interface 150 (e.g., a speaker, etc.) and the power supplier 190. The input interface 140 (e.g., a microphone, etc.) may receive a user's voice and ambient sound. The printed circuit board 105 may transmit an electrical signal to each component of the electronic apparatus 100. The output interface 150 may output an audio signal. The power supplier 190 may supply power required to drive each component of the electronic apparatus 100, such as the printed circuit board 105. Each of the first and second support portions 101 and 102 may include a hinge portion 104 for coupling to the main body portion 103 of the electronic apparatus 100.

FIG. 13 is a diagram illustrating a flowchart according to an embodiment of the disclosure.

Referring to FIG. 13, a controlling method of the electronic apparatus 100 providing AR content may include displaying the AR content on the display 110 in operation S1310, detecting a hand of a user from image frames obtained through the camera 120 in operation S1320, and identifying an interaction of the hand for the AR content based on the size of the hand in operation S1330. The size of the hand may be obtained based on the information about the object, in response to an interaction of the hand with respect to an object provided through the display 110 occurring.

In operation S1310, the controlling method may display the AR content on the display 110.

In operation S1320, the user's hand may be detected from the image frames obtained through the camera 120.

According to an embodiment, the size of the detected hand may be set to a predetermined value. In this example, when the interaction of the hand with respect to the object provided through the display 110 is generated, the size of the hand may be obtained based on the information on the object.

As an embodiment, the size of the detected hand may be set to a preset value. It may be identified whether interaction of the hand occurs for an object provided through the display 110 based on the set size. Based on identification that the interaction occurs, the size of the hand may be identified based on the information about the object.

According to an embodiment, the object may include at least one of an object of a first type included in an image frame obtained through the camera 120 and an object of a second type included in the AR content displayed on the display 110.

As an embodiment, the method may further include, based on a first type object and the hand of the user being detected from image frames obtained through the camera 120, identifying whether the first type object is the reference object based on feature information of the reference object stored in the electronic apparatus 100 and feature information of the detected first type object; and based on identification that the first type object is the reference object, identifying the size of the hand based on the size of the reference object stored in the electronic apparatus 100.

According to an embodiment, the method may further include, based on identification that the first type object is not the reference object based on the feature information stored in the electronic apparatus 100 and the feature information of the detected first type object, identifying the size of the first type object included in consecutive image frames using the consecutive image frames obtained through the camera 120 and identifying the size of the hand based on the identified size of the first type object.

According to an embodiment, the method may further include setting the size of the detected hand as a preset value; identifying whether the interaction of the hand occurs for the second type object through the display based on the set size; and identifying the size of the hand based on depth of the second type object in which interaction of the hand is identified.

In operation S1330, the interaction of the hand with respect to the AR content may be identified based on the size of the hand in operation S1330.

According to various embodiments of the disclosure as described above, an electronic apparatus for estimating a distance to an object more accurately by using a camera and a control method thereof are provided.

According to an embodiment of the present disclosure, it is possible to accurately estimate the size of the user's hand, and accurately estimate the parameter for the user's hand.

Various embodiments may be implemented as software that includes instructions stored in machine-readable storage media readable by a machine (e.g., a computer). A device may call instructions from a storage medium and operate in accordance with the called instructions, including an electronic apparatus (e.g., the electronic apparatus 100). When the instruction is executed by a processor, the processor may perform the function corresponding to the instruction, either directly or under the control of the processor, using other components. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

According to embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PLAYSTORE™). In the case of on-line distribution, at least a portion of the computer program product may be stored temporarily in a storage medium, such as a manufacturer's server, a server in an application store, a memory in a relay server, and the like, or temporarily generated.

Each of the components (for example, a module or a program) according to embodiments may include one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations may be added.

What is claimed is:

1. An electronic apparatus providing augmented reality (AR) content, comprising:
   a display;
   a camera; and
   a processor configured to:
   provide augmented reality (AR) content or an object through the display,
   detect a hand of a user based on an image obtained through the camera,
   identify a first interaction of the hand with the object provided through the display,
   obtain a size of the hand based on information about the object provided through the display, and
   identify a second interaction of the hand with the AR content based on the size of the hand.

2. The electronic apparatus of claim 1, wherein the processor is further configured to:
   set the size of the detected hand to a preset value,
   identify whether the first interaction of the hand occurs for the object provided through the display based on the set size,
   based on identifying that the first interaction occurs, identify the size of the hand based on the information about the object, and
   identify the second interaction of the hand for the AR content based on the identified size of the hand.

3. The electronic apparatus of claim 1, wherein the object comprises at least one of a first type object included in the image obtained through the camera and a second type object included in the AR content displayed on the display.

4. The electronic apparatus of claim 3, further comprising:
   a memory storing feature information about a reference object,
   wherein the processor is further configured to:
   based on the first type object and the hand of the user being detected from the image obtained through the camera, identify whether the first type object is the reference object based on the feature information stored in the memory and feature information of the detected first type object, and
   based on identifying that the first type object is the reference object, identify the size of the hand based on a size of the reference object.

5. The electronic apparatus of claim 4, wherein the processor is further configured to:
   based on identifying that the first type object is not the reference object, identify the size of the first type object included in consecutive image frames by using the consecutive image frames obtained through the camera, and
   identify the size of the hand based on the size of the first type object.

6. The electronic apparatus of claim 3, wherein the processor is further configured to:
   set the size of the hand to a preset value,
   identify whether the first interaction of the hand occurs with the second type object through the display based on the set size, and
   identify the size of the hand based on a depth of the second type object in which the first interaction of the hand is identified.

7. A method of controlling an electronic apparatus providing augmented reality (AR) content, the method comprising:
   providing augmented reality (AR) content or an object on the display;
   detecting a hand of a user based on image obtained through a camera;
   identifying a first interaction of the hand with the object provided through the display;
   obtaining a size of the hand based on information about the object provided through the display; and
   identifying a second interaction of the hand with the AR content based on the size of the hand.

8. The method of claim 7, further comprising:
   setting the size of the detected hand to a preset value;
   identifying whether the first interaction of the hand occurs for the object provided through the display based on the set size; and
   based on identifying that the first interaction occurs, identifying the size of the hand based on the information about the object.

9. The method of claim 7, wherein the object comprises at least one of a first type object included in the image obtained through the camera and a second type object included in the AR content displayed on the display.

10. The method of claim 9, further comprising:
    based on the first type object and the hand of the user being detected from the image obtained through the camera, identifying whether the first type object is a reference object based on feature information stored in the electronic apparatus and feature information of the detected first type object; and
    based on identifying that the first type object is the reference object, identifying the size of the hand based on a size of the reference object.

11. The method of claim 10, further comprising:
    based on identifying that the first type object is not the reference object, identifying the size of the first type object included in consecutive image frames by using the consecutive image frames obtained through the camera; and
    identifying the size of the hand based on the size of the first type object.

12. The method of claim 9, further comprising:
    setting the size of the hand to a preset value;
    identifying whether the first interaction of the hand occurs with the second type object through the display based on the set size; and
    identifying the size of the hand based on a depth of the second type object in which the first interaction of the hand is identified.

* * * * *